(12) United States Patent
He

(10) Patent No.: US 11,221,530 B2
(45) Date of Patent: Jan. 11, 2022

(54) DISPLAY PANEL AND DISPLAY DEVICE

(71) Applicant: HKC Corporation Limited, Shenzhen (CN)

(72) Inventor: Huai Liang He, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 473 days.

(21) Appl. No.: 16/313,142

(22) PCT Filed: Nov. 7, 2017

(86) PCT No.: PCT/CN2017/109765
§ 371 (c)(1),
(2) Date: Dec. 25, 2018

(87) PCT Pub. No.: WO2019/084981
PCT Pub. Date: May 9, 2019

(65) Prior Publication Data
US 2021/0223646 A1    Jul. 22, 2021

(30) Foreign Application Priority Data
Nov. 3, 2017  (CN) .......................... 201711072902.6

(51) Int. Cl.
*G02F 1/1368*    (2006.01)
*G02F 1/1362*    (2006.01)
*G09G 3/36*      (2006.01)

(52) U.S. Cl.
CPC ...... *G02F 1/136286* (2013.01); *G02F 1/1368* (2013.01); *G09G 3/3607* (2013.01); *G09G 2300/0452* (2013.01)

(58) Field of Classification Search
CPC ............. G02F 1/1368; G02F 1/136286; H01L 27/156; G09G 3/3607; G09G 2300/0452
(Continued)

(56) References Cited

U.S. PATENT DOCUMENTS

2014/0054624 A1*  2/2014  Chen .................... H01L 27/156
                                                                 257/89
2014/0354520 A1   12/2014  Sato et al.
(Continued)

FOREIGN PATENT DOCUMENTS

CN    101191331 A    6/2008
CN    202855738 U    4/2013
(Continued)

OTHER PUBLICATIONS

Jing Yang, the ISA written comments, Jul. 2018, CN.
Jing Yang, the International Search Report, dated Jul. 2018, CN.

*Primary Examiner* — Abdul-Samad A Adediran

(57) ABSTRACT

A display panel includes scanning lines, data lines, and pixel areas. A plurality of the scanning lines are parallelly disposed along a first direction of the display panel. A plurality of the data lines are parallelly disposed along a second direction of the display panel. Each pixel area is controlled by three adjacent data lines and two adjacent scanning lines to display. Each pixel area includes a base sub-pixel and a matching sub-pixel. The base sub-pixel includes three base unit pixels, and the data lines corresponding to each pixel area include a first data line and a second data line. The first data line is coupled with the three base unit pixels, and the second data line is coupled with the matching sub-pixel. The matching sub-pixel shares one scanning line with at least one base unit pixel.

11 Claims, 8 Drawing Sheets

(58) Field of Classification Search
USPC .......................................................... 257/89
See application file for complete search history.

(56) References Cited

U.S. PATENT DOCUMENTS

2016/0260401 A1* 9/2016 Sakaigawa ............ G09G 3/3607
2019/0056609 A1* 2/2019 Kim ...................... G02F 1/1368

FOREIGN PATENT DOCUMENTS

| CN | 203595880 U | 5/2014 |
| --- | --- | --- |
| CN | 104078490 A | 10/2014 |
| CN | 104678670 A | 6/2015 |
| CN | 105185244 A | 12/2015 |
| CN | 105388674 A | 3/2016 |
| CN | 106683635 A | 5/2017 |

* cited by examiner

DISPLAY PANEL AND DISPLAY DEVICE

TECHNICAL FIELD

The present disclosure relates to a field of display technology, and in particular to a display panel and a display device BACKGROUND A display apparatus has advantages, such as a thin body, saving-power, no radiation, and is widely used. A conventional display apparatus mostly is a backlight display apparatus, which comprises a liquid crystal display (LCD) panel and a backlight module. Operating principle of the display apparatus is that liquid crystal (LC) molecules are disposed between two substrates, where the two substrates are parallelly disposed, and a driver voltage applies on the two substrates to control rotation direction of the LC molecules, so that light of a backlight module are refracted to generate images.

A thin film transistor-liquid crystal display (TFT-LCD) has some good characteristics, such as having low power consumption, excellent image quality, and high production yield, which has gradually occupied a main position of a display field. The TFT-LCD includes a display panel and the backlight module, where the display panel includes a color filter (CF) substrate, a TFT substrate and a mask. A transparent electrode is disposed on inner side of the two substrates and the LC layer is disposed between the two substrates.

However, with increased resolution and scanning frequency of the display, the number of data lines is increasing, and demand for the number of chips on film (COF) is also increasing, which makes manufacturing process more complicated and costly when ensuring a certain display quality of the display panel.

SUMMARY

The technical problem to be solved by the present disclosure is to provide a display panel that reduces data lines and saves costs.

Besides, the present disclosure provides a display device.

A purpose of the present disclosure is realized by the following technical solution: a display panel comprises:
scanning lines, a plurality of the scanning lines are disposed in parallel along a first direction of the display panel;
data lines, a plurality of the data lines are disposed in parallel along a second direction of the display panel; and
pixel areas, each pixel area is controlled by three adjacent data lines and two adjacent scanning lines to display.

Each pixel area comprises a base sub-pixel and a matching sub-pixel. The base sub-pixel comprises three base unit pixels, and the data lines corresponding to each pixel area comprise a first data line and a second data line. The first data line is coupled with the three base unit pixels, and the second data line is coupled with the matching sub-pixel; the matching sub-pixel shares one scanning line with at least one base unit pixel.

Furthermore, the base sub-pixel comprises the three base unit pixels are coupled with the first data line. The three base unit pixels are a first base unit pixel, a second base unit pixel, and a third base unit pixel. The first base unit pixel, the second base unit pixel, and the third base unit pixel are disposed along the second direction in sequence. A setting of the three base unit pixels ensures a richness of colors, which promotes a realization of an effectiveness of the three primary colors. The three base unit pixels are disposed along the second direction, that is, the direction of the data lines. The three base unit pixels are coupled with the first data line, so that orderly setting facilitates a realization of a connection function, simplifies process, and avoids affecting normal operation of the display panel because of the complicated arrangement. Thus, the data lines are reduced by one half, which further reduce costs.

Furthermore, the matching sub-pixel comprises three matching unit pixels coupled with the second data line. The three matching unit pixels are a first matching unit pixel, a second matching unit pixel, and a third matching unit pixel. The scanning lines corresponding to each pixel area comprise a first scanning line, a second scanning line, and a third scanning line. The first matching unit pixel shares the first scanning line with the first base unit pixel. The second matching unit pixel shares the second scanning line with the second base unit pixel. The third matching unit pixel shares the third scanning line with the third base unit pixel. The three matching pixels of the matching sub-pixel respectively share the scanning lines with the three base unit pixels of the base sub-pixel, which saves the data lines as well as realizes an independent control, and is convenient for maintenance and is beneficial to a long-term use of the display panel.

Furthermore, the first matching unit pixel, the second matching unit pixel, and the third matching unit pixel are disposed along the second direction in sequence. The three matching unit pixels are disposed along the second direction, that is, the direction of the data lines. The three matching unit pixels are coupled with the second data line, so that orderly setting facilitates the realization of the connection function, simplifies process, and avoids affecting normal operation of the display panel because of the complicated arrangement.

Furthermore, the first base unit pixel, the second base unit pixel, the third base unit pixel, and the matching sub-pixel occupy an equal size in each pixel area. At this time, proportions occupied by the three base unit pixels and the matching sub-pixel in each pixel area are the same, and the arrangement only changes widths and heights of the first base unit pixel, the second base unit pixel, the third base unit pixel, and the matching sub-pixel to some extent.

Furthermore, the first base unit pixel, the second base unit pixel, the third base unit pixel, and the matching sub-pixel are rectangular in shape. The rectangular shape is simple and is easy to lay out, which reduces difficulty of the process and saves cost.

Furthermore, the first base unit pixel, the second base unit pixel, the third base unit pixel, and the matching sub-pixel occupy the equal size in each pixel area. The first base unit pixel, the second base unit pixel, the third base unit pixel, the first matching unit pixel, the second matching unit pixel, and the third matching unit pixel are rectangular in shape. The first matching unit pixel, the second matching unit pixel, and the third matching unit pixel are equal in size. At this time, the proportions occupied by the three base unit pixels and the matching sub-pixel in each pixel area are the same, and the arrangement only changes widths and heights of the first base unit pixel, the second base unit pixel, the third base unit pixel, and the matching sub-pixel to some extent. The rectangular shape is simple and is easy to lay out, which reduces difficulty of the process and saves cost. The three matching unit pixels having same size are easy to arrange and connect with the three base unit pixels having same size in the pixel area.

Furthermore, the base sub-pixel comprises the first base unit pixel using a red unit pixel, the second base unit pixel using a green unit pixel, and the third base unit pixel using a blue unit pixel. The matching sub-pixel uses a white sub-pixel. The WRGB technology has advantages, such as high light transmittance, high brightness, and low energy consumption, which is suitable to improve display resolution and scanning frequency.

The base sub-pixel comprises the first base unit pixel using a red unit pixel, the second base unit pixel using a green unit pixel, and the third base unit pixel using a blue unit pixel; the matching sub-pixel uses a yellow sub-pixel. The YRGB technology makes colors more abundant, and is capable of better improving the display quality, and brings a better sensory experience for users.

According to another aspect of the present disclosure, the present disclosure provides a display device. The display device comprises a backlight module and a display panel.

The base-unit pixel is coupled with the first data line and the matching sub-pixel is coupled with the second data line in each pixel area, and the matching sub-pixel shares one scanning line with at least one base unit pixel of the base sub-pixel, which saves a layout of the data lines, reduces a use of the driver chip, and reduces costs to improve a high standard experience of display resolution and scanning frequency.

BRIEF DESCRIPTION OF DRAWINGS

The drawings are included to provide a further understanding of the embodiments of the present disclosure, and are intended to illustrate the embodiments of the present disclosure Obviously, the drawings in the below description are only some of the embodiments of the present disclosure, and those skilled in the art are able to obtain other drawings according to the drawings without any inventive labor. In the drawing.

DETAILED DESCRIPTION

Specific structure and function details disclosed herein are only representative and are used for the purpose of describing exemplary embodiments of the present disclosure. However, the present disclosure may be achieved in many alternative forms and shall not be interpreted to be only limited to the embodiments described herein.

It should be understood in the description of the present disclosure that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified. In addition, the term "comprise" and any variant are intended to cover non-exclusive inclusion.

It should be noted in the description of the present disclosure that, unless otherwise regulated and defined, terms such as "installation," "bonded," and "bonding" shall be understood in broad sense, and for example, may refer to fixed bonding or detachable bonding or integral bonding; may refer to mechanical bonding or electrical bonding; and may refer to direct bonding or indirect bonding through an intermediate medium or inner communication of two elements. For those of ordinary skill in the art, the meanings of the above terms in the present disclosure may be understood according to concrete conditions.

The terms used herein are intended to merely describe concrete embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present disclosure will be further described in detail below in combination with the drawings and preferred embodiments.

Figure 1:
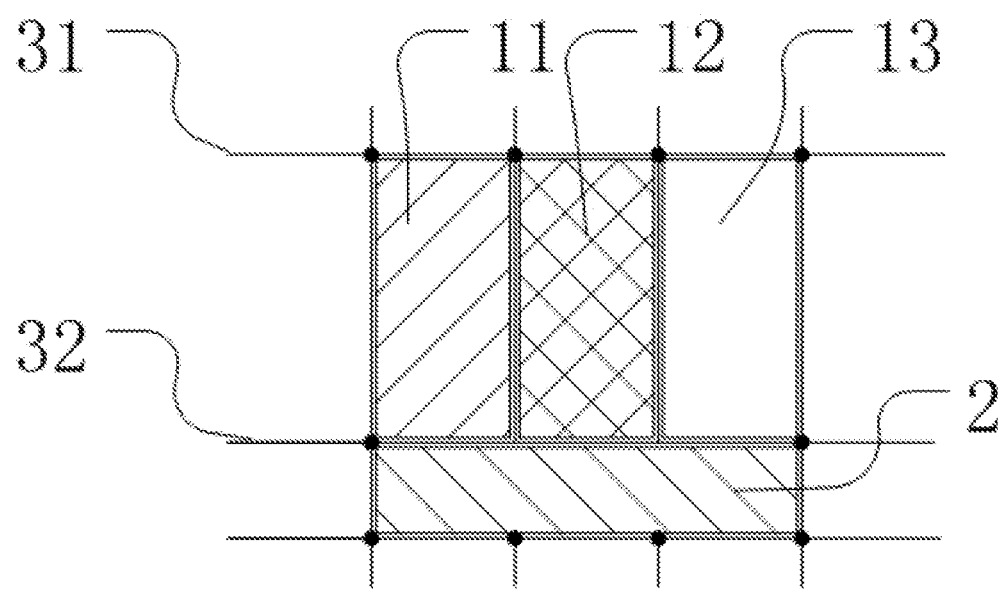
FIG. 1 is a schematic diagram of a pixel structure of a display panel according to an embodiment of the present disclosure.
Figure 2:
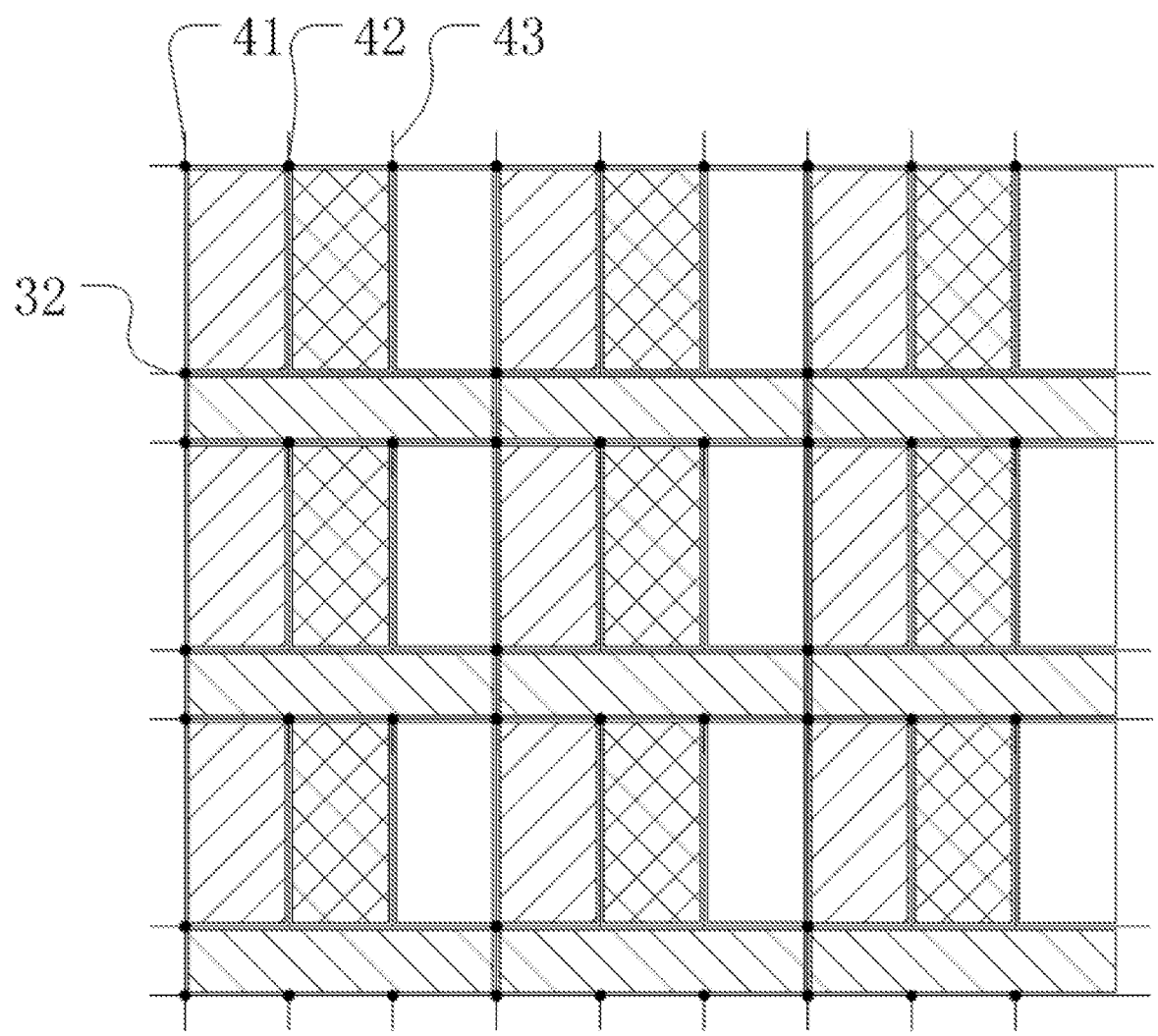
FIG. 2 is a schematic diagram of the pixel structure of the display panel according to an embodiment of the present disclosure.

In an embodiment of the present disclosure, as shown in FIG. 1 and FIG. 2, the present disclosure of a display panel comprises scanning lines, data lines, and pixel areas. A plurality of the scanning lines are disposed in parallel along a first direction of the display panel and a plurality of the data lines are disposed in parallel along a second direction of the display panel. Each pixel area is controlled by three adjacent data lines and two adjacent scanning lines to display. Each pixel area comprises a base sub-pixel and a matching sub-pixel 2. The base sub-pixel comprises three base unit pixels, and the scanning lines corresponding to each pixel area comprise a first scanning line 31 and a second scanning line 32. The first scanning line 31 is coupled with the three base unit pixels, and the second scanning line 32 is coupled with the matching sub-pixel 2. The matching sub-pixel 2 shares one data line with at least one base unit pixel. The first direction is a horizontal direction as shown in drawings, and the second direction is a vertical direction as shown in drawings. The base-unit pixel is coupled with the first scanning line 31 and the matching sub-pixel is coupled with the second scanning line 32 in each pixel area, and the matching sub-pixel 2 shares one data line with at least one base unit pixel of the base sub-pixel, which saves a layout of the data lines, reduces a use of the driver chip, and reduces costs to improve a high standard experience of display resolution and scanning frequency.

In another embodiment of the present disclosure, as shown in FIG. 1 and FIG. 2, the display panel comprises scanning lines, data lines, and pixel areas. A plurality of the scanning lines are disposed in parallel along the first direction of the display panel and a plurality of the data lines are disposed in parallel along the second direction of the display panel. Each pixel area is controlled by three adjacent data lines and two adjacent scanning lines to display. Each pixel area comprises the base sub-pixel and the matching sub-pixel 2. The base sub-pixel comprises three base unit pixels, and the scanning lines corresponding to each pixel area comprise the first scanning line 31 and the second scanning line 32. The first scanning line 31 is coupled with the three base unit pixels, and the second scanning line 32 is coupled with the matching sub-pixel 2. The matching sub-pixel 2 shares one data line with at least one base unit pixel. The base-unit pixel is coupled with the first scanning line 31 and the matching sub-pixel 2 is coupled with the second scanning line 32 in each pixel area, and the matching sub-pixel 2 shares one data line with at least one base unit pixel of the base sub-pixel, which saves the layout of the data lines, reduces the use of the driver chip, and reduces costs to improve the high standard experience of display resolution and scanning frequency of the display apparatus.

To be specific, the base sub-pixel comprises three base unit pixels coupled with the first scanning line 31. The three base unit pixels are a first base unit pixel 11, a second base unit pixel 12, and a third base unit pixel 13, where the first base unit pixel 11, the second base unit pixel 12, and the third base unit pixel 13 are disposed along the first direction in sequence. The three base unit pixels are disposed along the first direction, that is, the direction of the scanning lines. The three base unit pixels are coupled with the first scanning line 31, so that orderly setting facilitates a realization of a connection function, simplifies process, and avoids affecting normal operation of the display panel because of the complicated arrangement. Thus, the data lines are reduced by a quarter, which further reduce costs. The first base unit pixel 11, the second base unit pixel 12, the third base unit pixel 13, and the matching sub-pixel 2 occupy an equal size in each pixel area. At this time, the proportions occupied by the three base unit pixels and the matching sub-pixel 2 in each pixel area are the same, and the arrangement only changes widths and heights of the first base unit pixel 11, the second base unit pixel 12, the third base unit pixel 13, and the matching sub-pixel 2 to some extent. The first base unit pixel 11, the second base unit pixel 12, the third base unit pixel 13, and the matching sub-pixel 2 are rectangular in shape. The rectangular shape is simple and is easy to lay out, which reduces difficulty of the process and saves cost.

To be specific, the scanning lines comprises a first scanning line 31, a second scanning line 32, and a third scanning line 33 disposed at a lower portion adjacent to the second scanning line 32 as shown in drawings. The base sub-pixel is disposed between the first scanning line 31 and the second scanning line 32. The matching sub-pixel 2 is disposed between the second scanning line 32 and the third scanning line 33.

To be specific, the base sub-pixel comprises the first base unit pixel 11 using a red unit pixel (R), the second base unit pixel 12 using a green unit pixel (G), and the third base unit pixel 13 using a blue unit pixel (B). The matching sub-pixel 2 uses a white sub-pixel (W). The WRGB technology has advantages, such as high light transmittance, high brightness, and low energy consumption, which is suitable to improve display resolution and scanning frequency. Or, the matching sub-pixel 2 uses a yellow sub-pixel (Y). The YRGB technology makes colors more abundant, and is capable of better improving the display quality, and brings a better sensory experience for users.

Figure 3:
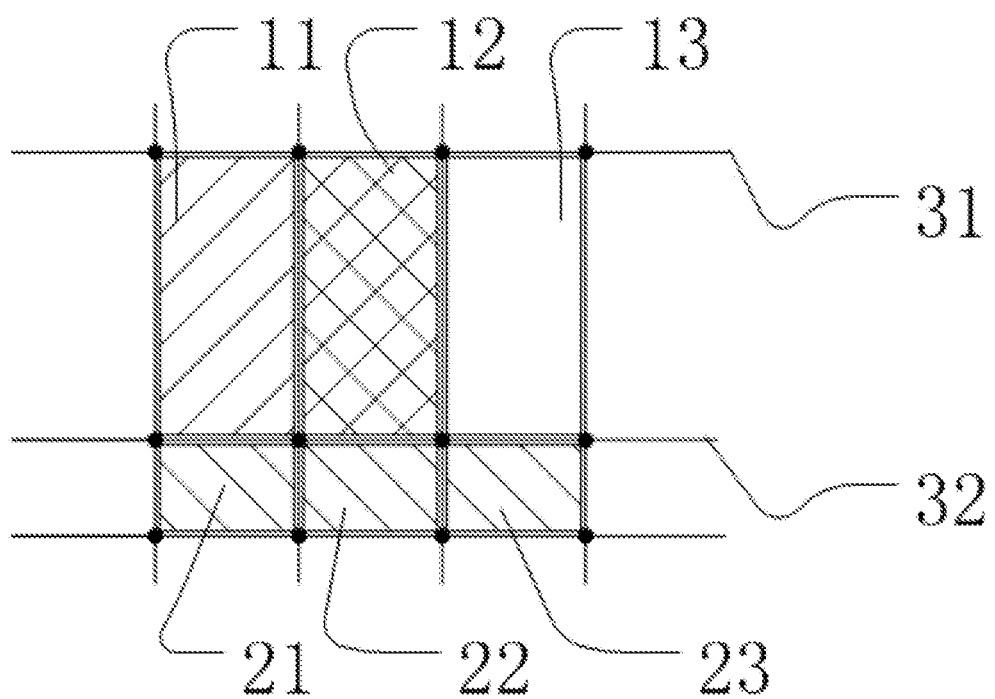
FIG. 3 is a schematic diagram of the pixel structure of the display panel according to an embodiment of the present disclosure.
Figure 4:
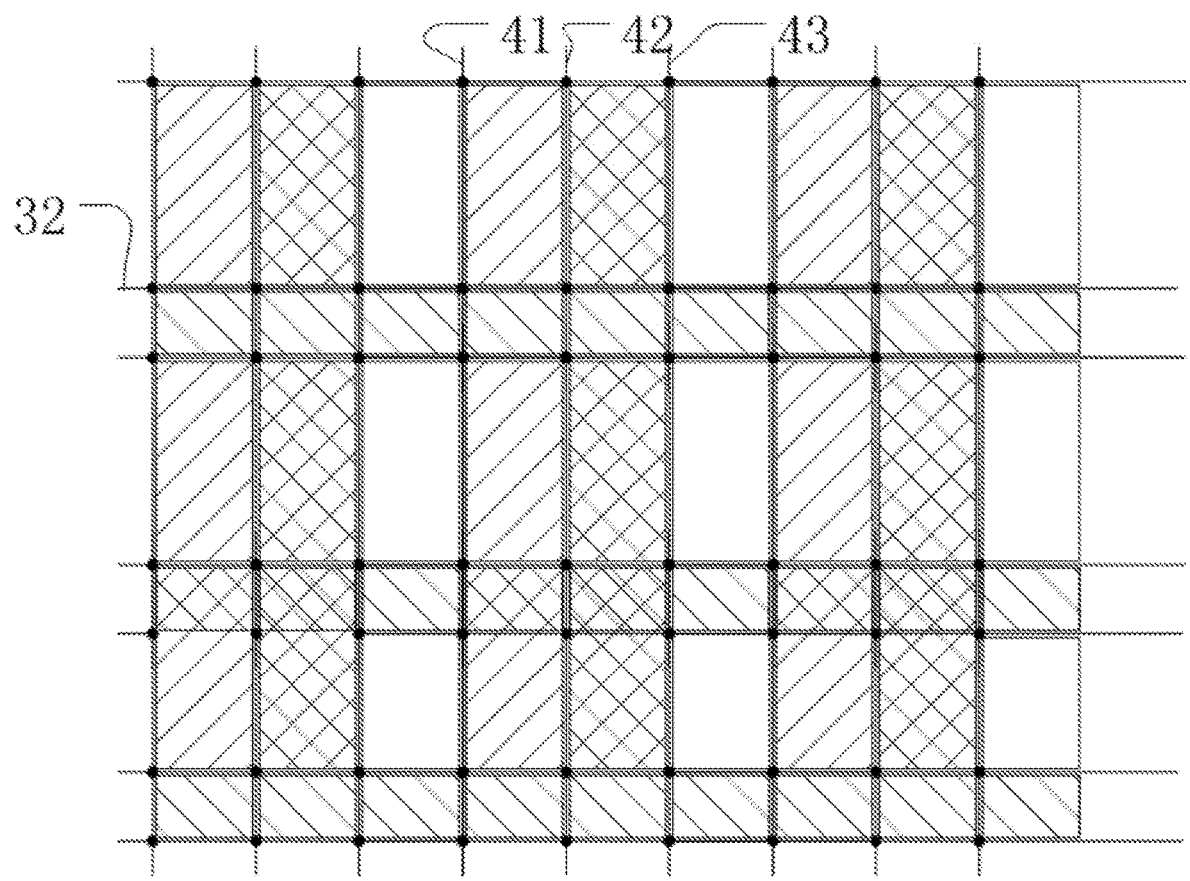
FIG. 4 is a schematic diagram of the pixel structure of the display panel according to an embodiment of the present disclosure.

In another embodiment of the present disclosure, as shown in FIG. 3 and FIG. 4, the display panel comprises scanning lines, data lines, and pixel areas. A plurality of the scanning lines are disposed in parallel along the first direction of the display panel and a plurality of the data lines are disposed in parallel along the second direction of the display panel. Each pixel area is controlled by three adjacent data lines and two adjacent scanning lines to display. Each pixel area comprises the base sub-pixel and the matching sub-pixel 2. The base sub-pixel comprises three base unit pixels, and the scanning lines corresponding to each pixel area comprise the first scanning line 31 and the second scanning line 32. The first scanning line 31 is coupled with the three base unit pixels, and the second scanning line 32 is coupled with the matching sub-pixel 2. The matching sub-pixel 2 shares one data line with at least one base unit pixel. The base-unit pixel is coupled with the first scanning line 31 and the matching sub-pixel 2 is coupled with the second scanning line 32 in each pixel area, and the matching sub-pixel 2 shares one data line with at least one base unit pixel, which saves the layout of the data lines, reduces the use of the driver chip, and reduces costs to improve the high standard experience of display resolution and scanning frequency.

To be specific, the matching sub-pixel 2 comprises three matching unit pixels coupled with the second scanning line 32, where the three matching unit pixels are a first matching unit pixel 21, a second matching unit pixel 22, and a third matching unit pixel 23. The data lines corresponding to each pixel area comprise a first data line 41, a second data line 42, and a third data line 43. The first matching unit pixel 21 shares the first data line 41 with the first base unit pixel 11. The second matching unit pixel 22 shares the second data line 42 with the second base unit pixel 12. The third matching unit pixel 23 shares the third data line 43 with the third base unit pixel 13. The three matching pixels of the matching sub-pixel 2 respectively share the data lines with the three base unit pixels of the base sub-pixel, which saves the data lines as well as realizes an independent control, and is convenient for maintenance and is beneficial to a long-term use of the display panel.

To be specific, the base sub-pixel comprises the three base unit pixels coupled with the first scanning line 31. The three base unit pixels are the first base unit pixel 11, the second base unit pixel 12, and the third base unit pixel 13, where the first base unit pixel 11, the second base unit pixel 12, and the third base unit pixel 13 are disposed along the first direction in sequence. The first matching unit pixel 21, the second matching unit pixel 22, and the third matching unit pixel 23 are disposed along the first direction in sequence. The unit pixels are disposed along the first direction, that is, the direction of the scanning lines. The unit pixels are respectively coupled with their respective scanning lines, so that orderly setting facilitates the realization of the connection function, simplifies process, and avoids affecting normal operation of the display panel because of the complicated arrangement. Thus, the data lines are reduced by a quarter, which further reduces costs.

To be specific, the first base unit pixel 11, the second base unit pixel 12, the third base unit pixel 13, and the matching sub-pixel 2 occupy the equal size in each pixel area. The first base unit pixel 11, the second base unit pixel 12, the third base unit pixel 13, the first matching unit pixel 21, the second matching unit pixel 22, and the third matching unit pixel 23 are rectangular in shape. The first matching unit pixel 21, the second matching unit pixel 22, and the third matching unit pixel 23 are equal in size. At this time, the proportions occupied by the three base unit pixels and the matching sub-pixel 2 in each pixel area are the same, and the arrangement only changes widths and heights of the first base unit pixel 11, the second base unit pixel 12, the third base unit pixel 13, and the matching sub-pixel 2 to some extent. The rectangular shape is simple and is easy to lay out, which reduces difficulty of the process and saves cost. The three matching unit pixels having same size are easy to arrange and connect with the three base unit pixels having same size in the pixel area.

To be specific, the scanning lines comprises the first scanning line 31, the second scanning line 32, and the third scanning line 33 disposed at the lower portion adjacent to the second scanning line 32. The base sub-pixel is disposed between the first scanning line 31 and the second scanning line 32. The matching sub-pixel 2 is disposed between the second scanning line 32 and the third scanning line 33.

To be specific, the base sub-pixel comprises the first base unit pixel 11 using the red unit pixel (R), the second base unit pixel 12 using the green unit pixel (G), and the third base unit pixel 13 using the blue unit pixel (B). The matching sub-pixel 2 uses the white sub-pixel (W). The WRGB technology has advantages, such as high light transmittance, high brightness, and low energy consumption, which is suitable to improve display resolution and scanning frequency. Or, the matching sub-pixel 2 uses the yellow sub-pixel (Y). The YRGB technology makes colors more abundant, and is capable of better improving the display quality, and brings a better sensory experience for users.

Figure 5:
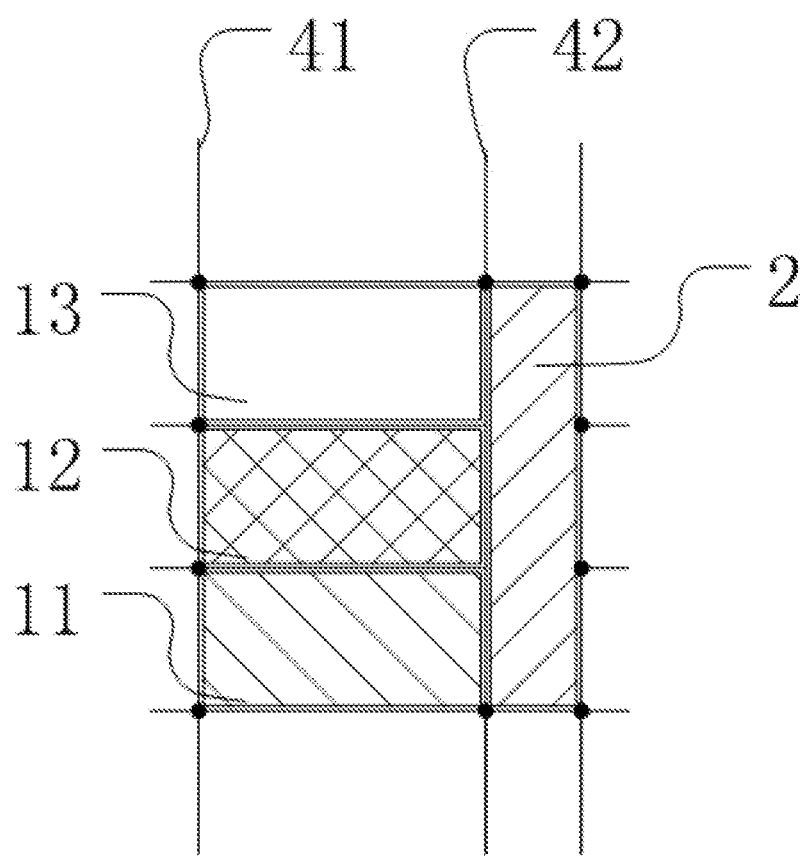
FIG. 5 is a schematic diagram of the pixel structure of the display panel according to an embodiment of the present disclosure.
Figure 6:
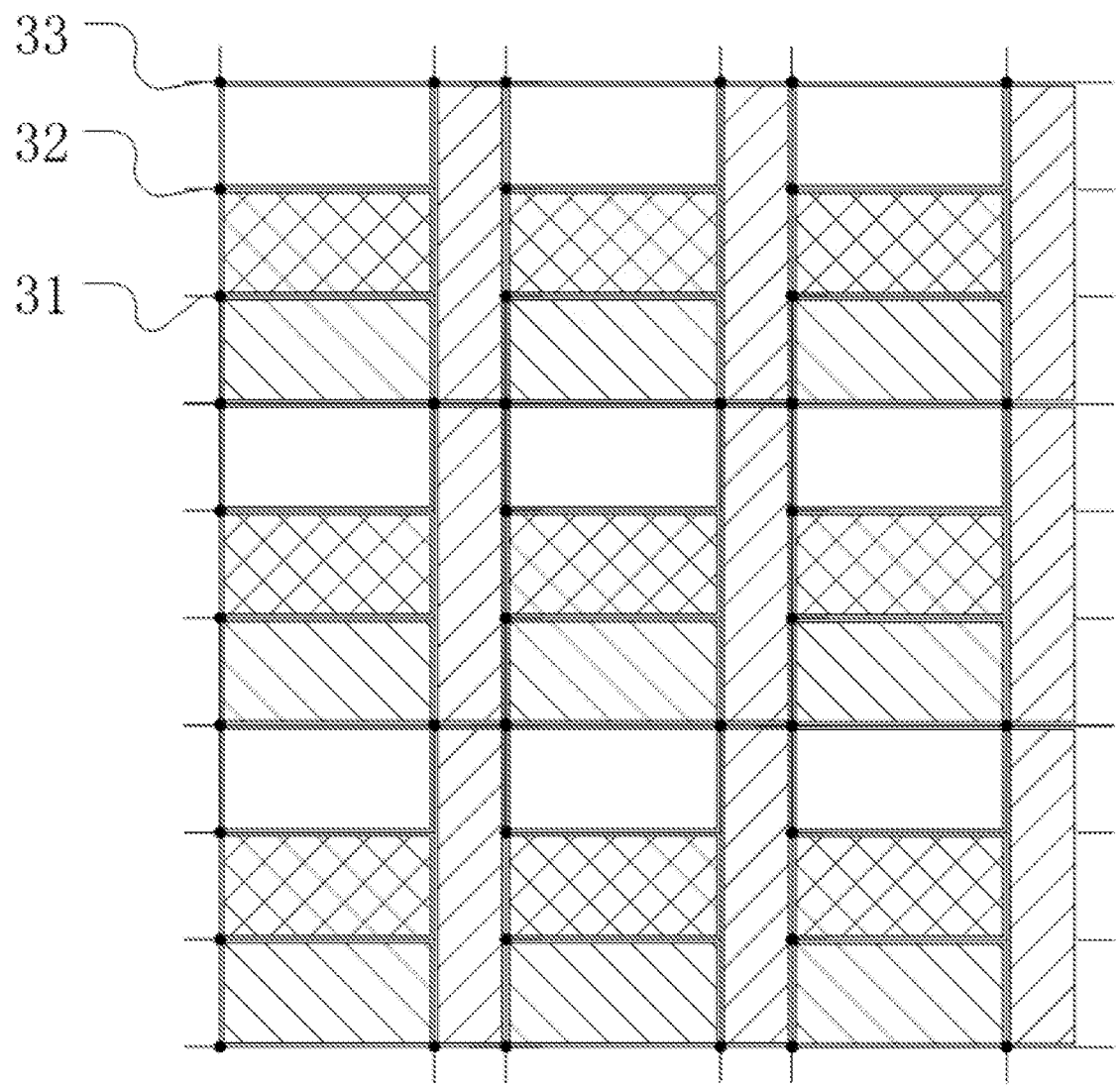
FIG. 6 is a schematic diagram of the pixel structure of the display panel according to an embodiment of the present disclosure.

In another embodiment of the present disclosure, as shown in FIG. 5 and FIG. 6, the display panel comprises scanning lines, data lines, and pixel areas. A plurality of the scanning lines are disposed in parallel along the first direction of the display panel and a plurality of the data lines are disposed in parallel along the second direction of the display panel. Each pixel area is controlled by three adjacent data lines and two adjacent scanning lines to display. Each pixel area comprises the base sub-pixel and the matching sub-pixel 2. The base sub-pixel comprises three base unit pixels, and the data lines corresponding to each pixel area comprise a first data line 41 and a second data line 42. The first data line 41 is coupled with the three base unit pixels, and the second data line 42 is coupled with the matching sub-pixel 2. The matching sub-pixel 2 shares one scanning line with at least one base unit pixel. The first direction is a horizontal direction as shown in drawings, and the second direction is a vertical direction. The base-unit pixel is coupled with the first data line 41 and the matching sub-pixel 2 is coupled with the second data line 42 in each pixel area, and the matching sub-pixel 2 shares one scanning line with at least one base unit pixel of the base sub-pixel, which saves the layout of the data lines, reduces the use of the driver chip, and reduces costs to improve the high standard experience of display resolution and scanning frequency.

In another embodiment of the present disclosure, as shown in FIG. 5 and FIG. 6, the display panel comprises scanning lines, data lines, and pixel areas. A plurality of the scanning lines are disposed in parallel along the first direction of the display panel and a plurality of the data lines are disposed in parallel along the second direction of the display panel. Each pixel area is controlled by three adjacent data lines and two adjacent scanning lines to display. Each pixel area comprises the base sub-pixel and the matching sub-pixel 2. The base sub-pixel comprises three base unit pixels, and the data lines corresponding to each pixel area comprise a first data line 41 and a second data line 42. The first data line 41 is coupled with the three base unit pixels, and the second data line 42 is coupled with the matching sub-pixel 2. The matching sub-pixel 2 shares one scanning line with at least one base unit pixel. The base-unit pixel is coupled with the first data line 41 and the matching sub-pixel 2 is coupled with the second data line 42 in each pixel area, and the matching sub-pixel 2 shares one scanning line with at least one base unit pixel of the base sub-pixel, which saves the layout of the data lines, reduces the use of the driver chip, and reduces costs to improve the high standard experience of display resolution and scanning frequency.

To be specific, the base sub-pixel comprises the three base unit pixels coupled with the first data line 41. The three base unit pixels are the first base unit pixel 11, the second base unit pixel 12, and the third base unit pixel 13, where the first base unit pixel 11, the second base unit pixel 12, and the third base unit pixel 13 are disposed along the second direction in sequence. The three base unit pixels are disposed along the second direction, that is, the direction of the data lines. The three base unit pixels are coupled with the first data line 41, so that orderly setting facilitates the realization of the connection function, simplifies process, and avoids affecting normal operation of the display panel because of the complicated arrangement. Thus, the data lines are reduced by one-half, which further reduces costs. The first base unit pixel 11, the second base unit pixel 12, the third base unit pixel 13, and the matching sub-pixel 2 occupy the equal size in each pixel area. At this time, the proportions occupied by the three base unit pixels and the matching sub-pixel 2 in each pixel area are the same, and the arrangement only changes widths and heights of the first base unit pixel 11, the second base unit pixel 12, the third base unit pixel 13, and the matching sub-pixel 2 to some extent. The first base unit pixel 11, the second base unit pixel 12, the third base unit pixel 13, and the matching sub-pixel 2 are rectangular in shape. The rectangular shape is simple and is easy to lay out, which reduces difficulty of the process and saves cost.

To be specific, the data lines comprise the first data line 41, the second data line 42, and the third data line 43 disposed at a right side adjacent to the second data line 42. The base sub-pixel is disposed between the first data line 41 and the second data line 42. The matching sub-pixel 2 is disposed between the second data line 42 and the third data line 43.

To be specific, the base sub-pixel comprises the first base unit pixel 11 using the red unit pixel (R), the second base unit pixel 12 using the green unit pixel (G), and the third base unit pixel 13 using the blue unit pixel (B). The matching sub-pixel 2 uses the white sub-pixel (W). The WRGB technology has advantages, such as high light transmittance, high brightness, and low energy consumption, which is suitable to improve display resolution and scanning frequency. Or, the matching sub-pixel 2 uses the yellow sub-pixel (Y). The YRGB technology makes colors more abundant, and is capable of better improving the display quality, and brings a better sensory experience for users.

Figure 7:
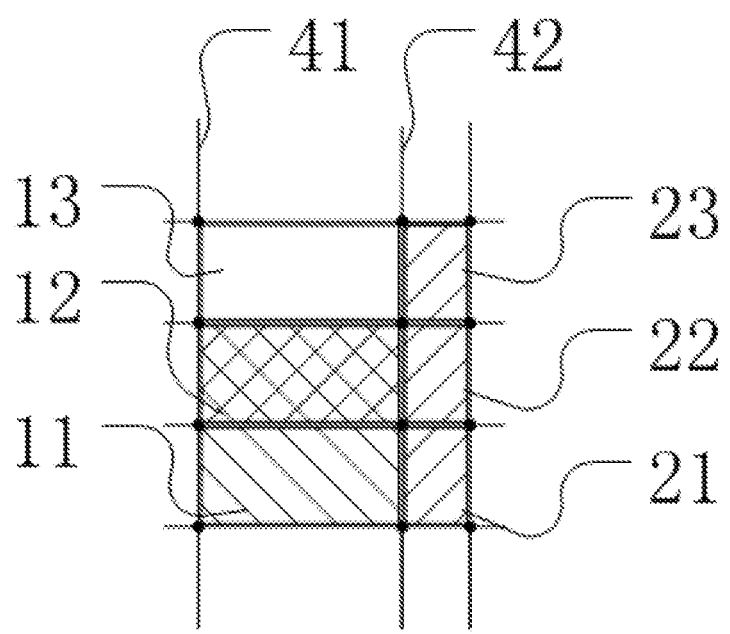
FIG. 7 is a schematic diagram of the pixel structure of the display panel according to an embodiment of the present disclosure.
Figure 8:
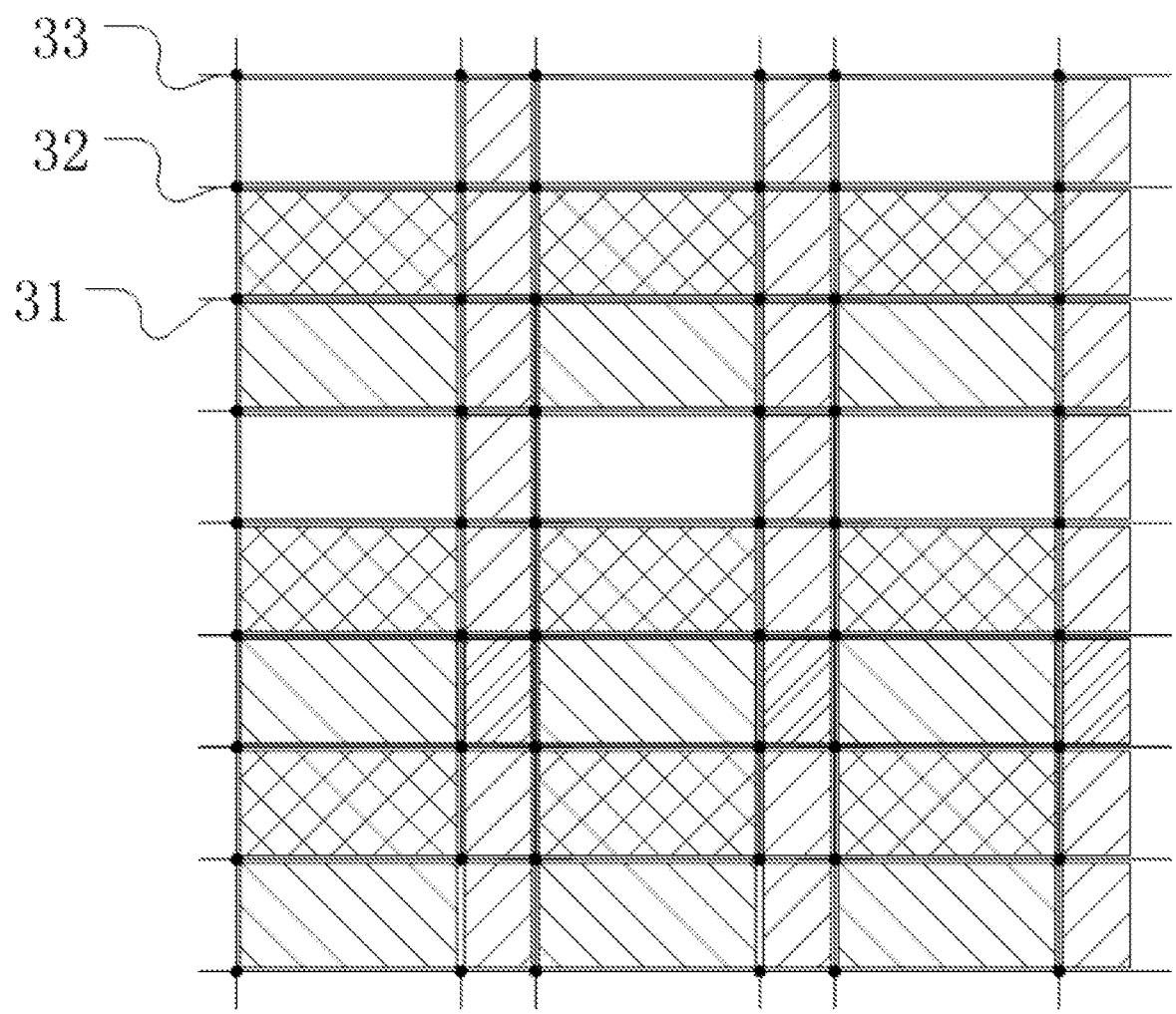
FIG. 8 is a schematic diagram of the pixel structure of the display panel according to an embodiment of the present disclosure.

In another embodiment of the present disclosure, as shown in FIG. 7 and FIG. 8, the display panel comprises scanning lines, data lines, and pixel areas. A plurality of the scanning lines are disposed in parallel along the first direction of the display panel and a plurality of the data lines are disposed in parallel along the second direction of the display panel. Each pixel area is controlled by three adjacent data lines and two adjacent scanning lines to display. Each pixel area comprises the base sub-pixel and the matching sub-pixel 2. The base sub-pixel comprises three base unit pixels, and the data lines corresponding to each pixel area comprise a first data line 41 and a second data line 42. The first data line 41 is coupled with the three base unit pixels, and the second data line 42 is coupled with the matching sub-pixel 2. The matching sub-pixel 2 shares one scanning line with at least one base unit pixel. The base-unit pixel is coupled with the first data line 41 and the matching sub-pixel 2 is coupled with the second data line 42 in each pixel area, and the matching sub-pixel 2 shares one scanning line with at least one base unit pixel of the base sub-pixel, which saves the layout of the data lines, reduces the use of the driver chip, and reduces costs to improve the high standard experience of display resolution and scanning frequency.

To be specific, the matching sub-pixel 2 comprises three matching unit pixels coupled with the second data line 42; the three matching unit pixels are the first matching unit pixel 21, the second matching unit pixel 22, and the third matching unit pixel 23. The scanning lines corresponding to each pixel area comprise the first scanning line 31, the second scanning line 32, and the third scanning line 33. The first matching unit pixel 21 shares the first scanning line 31 with the first base unit pixel 11. The second matching unit pixel 22 shares the second scanning line 32 with the second base unit pixel 12. The third matching unit pixel 23 shares the third scanning line 33 with the third base unit pixel 13. The three matching pixels of the matching sub-pixel 2 respectively share the scanning lines with the three base unit pixels of the base sub-pixel, which saves the data lines as well as realizes the independent control, and is convenient for maintenance and is beneficial to the long-term use of the display panel.

To be specific, the base sub-pixel comprises the three base unit pixels coupled with the first data line 41. The three base unit pixels are a first base unit pixel 11, a second base unit pixel 12, and a third base unit pixel 13, where the first base unit pixel 11, the second base unit pixel 12, and the third base unit pixel 13 are disposed along the second direction in sequence. The three base unit pixels are disposed along the second direction, that is, the direction of the data lines. The three base unit pixels are respectively coupled with the data lines, so that orderly setting facilitates the realization of the connection function, simplifies process, and avoids affecting normal operation of the display panel because of the complicated arrangement. Thus, the data lines are reduced by one-half, which further reduces costs. The first base unit pixel 11, the second base unit pixel 12, the third base unit pixel 13, and the matching sub-pixel 2 occupy the equal size in each pixel area. The first base unit pixel 11, the second base unit pixel 12, the third base unit pixel 13, the first matching unit pixel 21, the second matching unit pixel 22, and the third matching unit pixel 23 are rectangular in shape. The first matching unit pixel 21, the second matching unit pixel 22, and the third matching unit pixel 23 are equal in size. At this time, the proportions occupied by the three base unit pixels and the matching sub-pixel in each pixel area are the same, and the arrangement only changes widths and heights of the first base unit pixel 11, the second base unit pixel 12, the third base unit pixel 13, and the matching sub-pixel 2 to some extent. The rectangular shape is simple and is easy to lay out, which reduces the difficulty of processes and saves costs. The three matching unit pixels having same size are easy to arrange and connect with the three base unit pixels having same size in the pixel area.

To be specific, the data lines comprise the first data line 41, the second data line 42, and the third data line 43 disposed at a right side adjacent to the second data line 42. The base sub-pixel is disposed between the first data line 41 and the second data line 42. The matching sub-pixel 2 is disposed between the second data line 42 and the third data line 43.

To be specific, the base sub-pixel comprises the first base unit pixel 11 using the red unit pixel (R), the second base unit pixel 12 using the green unit pixel (G), and the third base unit pixel 13 using the blue unit pixel (B). The matching sub-pixel 2 uses the white sub-pixel (W). The WRGB technology has advantages, such as high light transmittance, high brightness, and low energy consumption, which is suitable to improve display resolution and scanning frequency. Or, the matching sub-pixel 2 uses the yellow sub-pixel (Y). The YRGB technology makes colors more abundant, and is capable of better improving the display quality, and brings a better sensory experience for users.

In another embodiment of the present disclosure, the present disclosure of a display device comprises a backlight module, and the display panel.

It should be noted that, in the above embodiments, material of the substrate is glass, plastic or a like.

In the above embodiment, the display panel is a liquid crystal display (LCD) panel, an organic light-emitting diode (OLED) panel, a curved panel, a plasma panel, etc. Taking the LCD panel as an example, the LCD panel comprises a thin film transistor (TFT) substrate and a color filter (CF) substrate, where the TFT substrate is disposed opposite to the CF substrate. A liquid crystal and a photo spacer (PS) are disposed between the TFT substrate and the CF substrate, and a thin film transistor (TFT) is disposed on the TFT substrate. A color filter layer is disposed on the CF substrate.

In the above embodiments, the CF substrate comprises a TFT array. The color filter and the TFT array form on a same substrate, and the TFT substrate comprises a color filter layer.

In the above embodiments, the display panel of the present disclosure is a curved-type panel.

The above content is a further detailed description of the present disclosure in conjunction with the specific preferred embodiments, and the specific implementation of the present disclosure is not limited to the description. It will be apparent to those skilled in the art that a number of simple deductions or substitutions may be made without departing from the conception of the present disclosure, which should be considered as being within the scope of the present disclosure.

What is claimed is:

1. A display panel, comprising:
scanning lines, a plurality of the scanning lines are disposed in parallel along a first direction of the display panel;
data lines, a plurality of the data lines are disposed in parallel along a second direction of the display panel; and
pixel areas, each pixel area is controlled by three adjacent data lines and two adjacent scanning lines to display;
wherein each pixel area comprises a base sub-pixel and a matching sub-pixel; the base sub-pixel comprises three base unit pixels, and the data lines corresponding to each pixel area comprise a first data line and a second data line; the first data line is coupled with the three base unit pixels, and the second data line is coupled with the matching sub-pixel; the matching sub-pixel shares one scanning line with at least one base unit pixel; the three base unit pixels are coupled with the first data line; the three base unit pixels are a first base unit pixel, a second base unit pixel, and a third base unit pixel; the first base unit pixel, the second base unit pixel, and the third base unit pixel are disposed along the second direction in sequence; the matching sub-pixel comprises three matching unit pixels coupled with the second data line; the three matching unit pixels are a first matching unit pixel, a second matching unit pixel, and a third matching unit pixel; the scanning lines corresponding to each pixel area comprise a first scanning line, a second scanning line, and a third scanning line; the first matching unit pixel shares the first scanning line with the first base unit pixel; the second matching unit pixel shares the second scanning line with the second base unit pixel; the third matching unit pixel shares the third scanning line with the third base unit pixel; the first matching unit pixel, the second matching unit pixel, and the third matching unit pixel are disposed along the second direction in sequence; the first base unit pixel, the second base unit pixel, the third base unit pixel, and the matching sub-pixel occupy an equal size in each pixel area; the first base unit pixel, the second base unit pixel, the third base unit pixel, the first matching unit pixel, the second matching unit pixel, and the third matching unit pixel are rectangular in shape; the first matching unit pixel, the second matching unit pixel, and the third matching unit pixel are equal in size; the base sub-pixel comprises the first base unit pixel using a red unit pixel, the second base unit pixel using a green unit pixel, and the third base unit pixel using a blue unit pixel; the matching sub-pixel uses a white sub-pixel; or, the base sub-pixel comprises the first base unit pixel using a red unit pixel, the second base unit pixel using a green unit pixel, and the third base unit pixel using a blue unit pixel; the matching sub-pixel uses a yellow sub-pixel.

2. A display panel comprising:

scanning lines, a plurality of the scanning lines are disposed in parallel along a first direction of the display panel;

data lines, a plurality of the data lines are disposed in parallel along a second direction of the display panel; and pixel areas, each pixel area is controlled by three adjacent data lines and two adjacent scanning lines to display;

wherein each pixel area comprises a base sub-pixel and a matching sub-pixel; the base sub-pixel comprises three base unit pixels, and the data lines corresponding to each pixel area comprise a first data line and a second data line; the first data line is coupled with the three base unit pixels, and the second data line is coupled with the matching sub-pixel; the matching sub-pixel shares one scanning line with at least one base unit pixel;

wherein the three base unit pixels are coupled with the first data line; the three base unit pixels are a first base unit pixel, a second base unit pixel, and a third base unit pixel; the first base unit pixel, the second base unit pixel, and the third base unit pixel are disposed along the second direction in sequence;

wherein the matching sub-pixel comprises three matching unit pixels coupled with the second data line; the three matching unit pixels are a first matching unit pixel, a second matching unit pixel, and a third matching unit pixel; the scanning lines corresponding to each pixel area comprise a first scanning line, a second scanning line, and a third scanning line; the first matching unit pixel shares the first scanning line with the first base unit pixel; the second matching unit pixel shares the second scanning line with the second base unit pixel; the third matching unit pixel shares the third scanning line with the third base unit pixel.

3. The display panel according to claim 2, wherein the first matching unit pixel, the second matching unit pixel, and the third matching unit pixel are disposed along the second direction in sequence.

4. The display panel according to claim 2, wherein the first base unit pixel, the second base unit pixel, the third base unit pixel, and the matching sub-pixel occupy an equal size in each pixel area.

5. The display panel according to claim 2, wherein the first matching unit pixel, the second matching unit pixel, and the third matching unit pixel are disposed along the second direction in sequence; the first base unit pixel, the second base unit pixel, the third base unit pixel, and the matching sub-pixel occupy an equal size in each pixel area.

6. The display panel according to claim 4, wherein the first base unit pixel, the second base unit pixel, the third base unit pixel, and the matching sub-pixel are rectangular in shape.

7. The display panel according to claim 2, wherein the first matching unit pixel, the second matching unit pixel, and the third matching unit pixel are disposed along the second direction in sequence; the first base unit pixel, the second base unit pixel, the third base unit pixel, and the matching sub-pixel occupy an equal size in each pixel area; the first base unit pixel, the second base unit pixel, the unit pixel, and the matching sub-pixel are rectangular in shape.

8. The display panel according to claim 2, wherein the first base unit pixel, the second base unit pixel, the third base unit pixel, and the matching sub-pixel occupy an equal size in each of the pixel areas; the first base unit pixel, the second base unit pixel, the third base unit pixel, the first matching unit pixel, the second matching unit pixel, and the third matching unit pixel are rectangular in shape; the first matching unit pixel, the second matching unit pixel and the third matching unit pixel are equal in size.

9. The display panel according to claim 2, wherein the base sub-pixel comprises a first base unit pixel using a red unit pixel, a second base unit pixel using a green unit pixel, and a third base unit pixel using a blue unit pixel; the matching sub-pixel uses a white sub-pixel.

10. The display panel according to claim 2, wherein the base sub-pixel comprises a first base unit pixel using a red unit pixel, a second base unit pixel using a green unit pixel, and a third base unit pixel using a blue unit pixel; the matching sub-pixel uses a yellow sub-pixel.

11. A display device, comprising:

a backlight component, and a display panel;

wherein the display panel comprising:

scanning lines, a plurality of the scanning lines are disposed in parallel along a first direction of the display panel;

data lines, a plurality of the data lines are disposed in parallel along a second direction of the display panel; and pixel areas, each pixel area is controlled by three adjacent data lines and two adjacent scanning lines to display;

wherein each pixel area comprises a base sub-pixel and a matching sub-pixel; the base sub-pixel comprises three base unit pixels, and the data lines corresponding to each pixel area comprise a first data line and a second data line; the first data line is coupled with the three base unit pixels, and the second data line is coupled with the matching sub-pixel; the matching sub-pixel shares one scanning line with at least one base unit pixel; the three base unit pixels are coupled with the first data line; the three base unit pixels are a first base unit pixel, a second base unit pixel, and a third base unit pixel; the first base unit pixel, the second base unit pixel, and the third base unit pixel are disposed along the second direction in sequence; the matching sub-pixel comprises three matching unit pixels coupled with the second data line; the three matching unit pixels are a first matching unit pixel, a second matching unit pixel, and a third matching unit pixel; the scanning lines corresponding to each pixel area comprise a first scanning line, a second scanning line, and a third scanning line; the first matching unit pixel shares the first scanning line with the first base unit pixel; the second matching unit pixel shares the second scanning line with the second base unit pixel; the third matching unit pixel shares the third scanning line with the third base unit pixel; the first matching unit pixel, the second matching unit pixel, and the third matching unit pixel are disposed along the second direction in sequence; the first base unit pixel, the second base unit pixel, the third base unit pixel, and the matching sub-pixel occupy an equal size in each pixel area; the first base unit pixel, the second base unit pixel, the third base unit pixel, the first matching unit pixel, the second matching unit pixel, and the third matching unit pixel are rectangular in shape; the first matching unit pixel, the second matching unit pixel, and the third matching unit pixel are equal in size; the base sub-pixel comprises the first base unit pixel using a red unit pixel, the second base unit pixel using a green unit pixel, and the third base unit pixel using a blue unit pixel; the matching sub-pixel uses a white sub-pixel; or, the base sub-pixel comprises the first base unit pixel using a red unit pixel, the second base unit pixel using a green unit pixel, and the third base unit pixel using a blue unit pixel; the matching sub-pixel uses a yellow sub-pixel.

\* \* \* \* \*